(12) United States Patent
Zhou et al.

(10) Patent No.: US 12,170,930 B2
(45) Date of Patent: Dec. 17, 2024

(54) CARRIER AGGREGATION—HANDOVER SYNERGISM

(71) Applicant: AT&T Intellectual Property I, L.P., Atlanta, GA (US)

(72) Inventors: Jianchun Zhou, Bellevue, WA (US); Yakun Gao, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 340 days.

(21) Appl. No.: 17/712,874

(22) Filed: Apr. 4, 2022

(65) Prior Publication Data
US 2023/0319665 A1    Oct. 5, 2023

(51) Int. Cl.
  H04W 4/00    (2018.01)
  H04W 36/00   (2009.01)
  H04W 36/30   (2009.01)

(52) U.S. Cl.
  CPC ..... H04W 36/302 (2023.05); H04W 36/0072 (2013.01)

(58) Field of Classification Search
  CPC .......................... H04W 36/00; H04W 36/0072
  See application file for complete search history.

(56) References Cited

U.S. PATENT DOCUMENTS

| | | | | |
|---|---|---|---|---|
| 2012/0294287 A1* | 11/2012 | Jeong | | H04W 36/08 370/331 |
| 2012/0300667 A1* | 11/2012 | Dalsgaard | | H04L 5/001 370/252 |
| 2019/0069192 A1* | 2/2019 | Palenius | | H04W 24/10 |
| 2019/0320463 A1* | 10/2019 | Yamada | | H04W 74/0808 |
| 2020/0077310 A1* | 3/2020 | Cheng | | H04W 76/27 |
| 2021/0058998 A1* | 2/2021 | Yuan | | H04W 72/21 |
| 2021/0120471 A1* | 4/2021 | Choi | | H04W 36/0094 |
| 2022/0078684 A1* | 3/2022 | Fehrenbach | | H04W 36/00837 |
| 2023/0067324 A1* | 3/2023 | Teyeb | | H04W 76/15 |
| 2023/0139950 A1* | 5/2023 | Damnjanovic | | H04W 36/08 370/331 |
| 2023/0300792 A1* | 9/2023 | Lei | | H04W 76/28 370/329 |

OTHER PUBLICATIONS

Petrut et. al., HetNet Handover Performance Analysis Based in RSRP vs. RSRQ Triggers, 2015, IEEE, 4 pages. (Year: 2015).*

(Continued)

*Primary Examiner* — Elisabeth Benoit Magloire
(74) *Attorney, Agent, or Firm* — Guntin & Gust, PLC; Robert Gingher

(57) ABSTRACT

Aspects of the subject disclosure may include, for example, determining a Reference Signal Received Power (RSRP) and a Signal to Noise Ratio (SNR) for a plurality of carriers at a user equipment (UE) device, the plurality of carriers transmitted by a source group of cells including a source primary cell (PCell) and one or more source secondary cells (SCells) associated with the source PCell, and initiating a handover of communication with the UE device from the source group of cells to a target group of cells, wherein the target group of cells includes a target PCell and one or more target SCells, wherein the initiating the handover is responsive to the RSRP exceeding a predetermined RSRP threshold and the SNR exceeding a predetermined SNR threshold. Other embodiments are disclosed.

20 Claims, 9 Drawing Sheets

(56) References Cited

OTHER PUBLICATIONS

Duan et al., Load balancing performance of dynamic Scell measurement period relaxing in LTE-A, 2013, IEEE, 5 pages. (Year: 2013).*
"Carrier aggregation", Wikipedia, Downloaded Mar. 30, 2022, 3 pages.

* cited by examiner

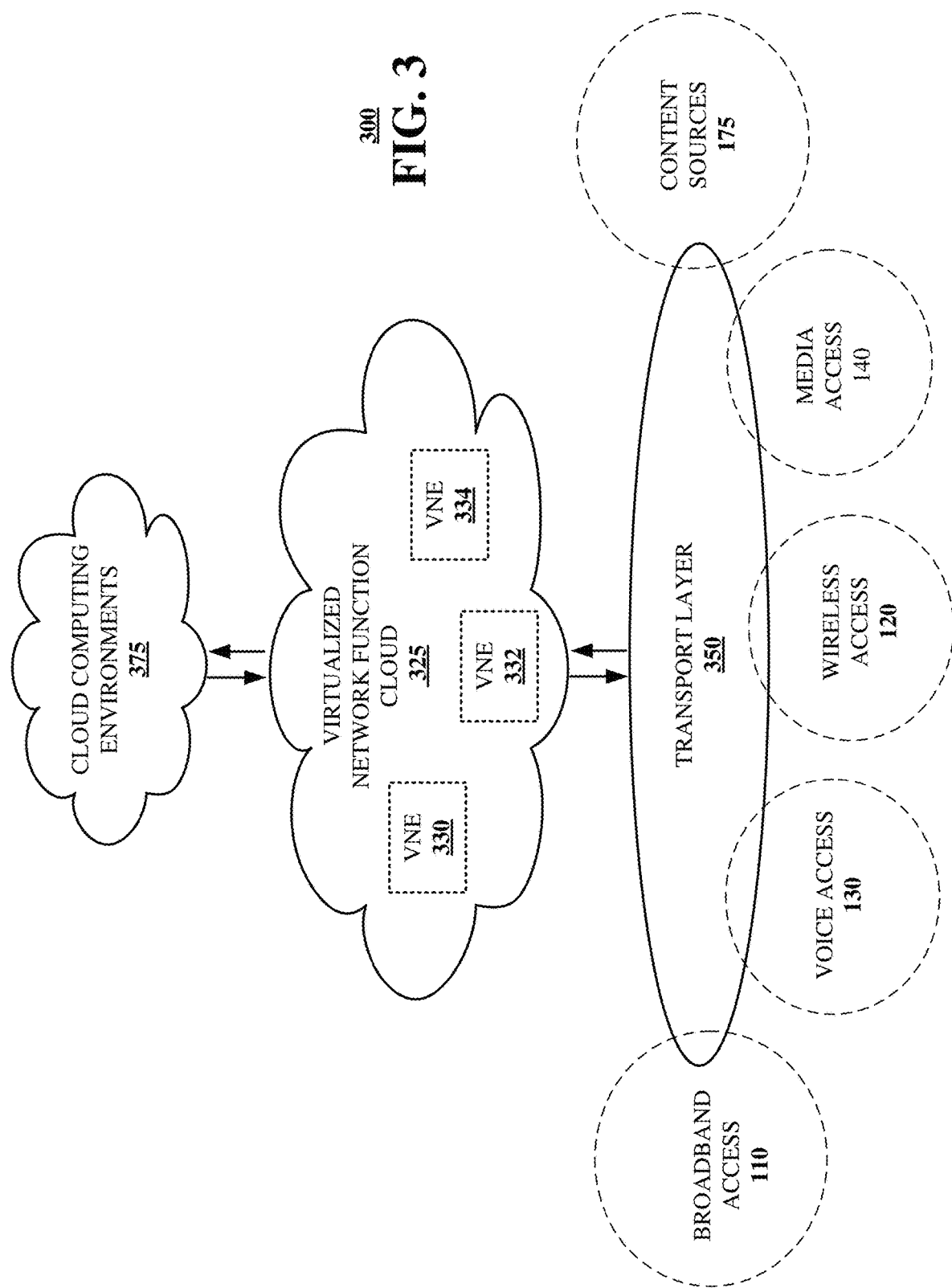

CARRIER AGGREGATION—HANDOVER SYNERGISM

FIELD OF THE DISCLOSURE

The subject disclosure relates to a synergism between carrier aggregation and handover in a mobile communication system.

BACKGROUND

In Fifth Generation (5G) and later cellular networks, a user equipment device may use carrier aggregation to improve performance and communication with a network. If the user equipment device is mobile, it may need to hand over communication from one base station or another network element to another.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
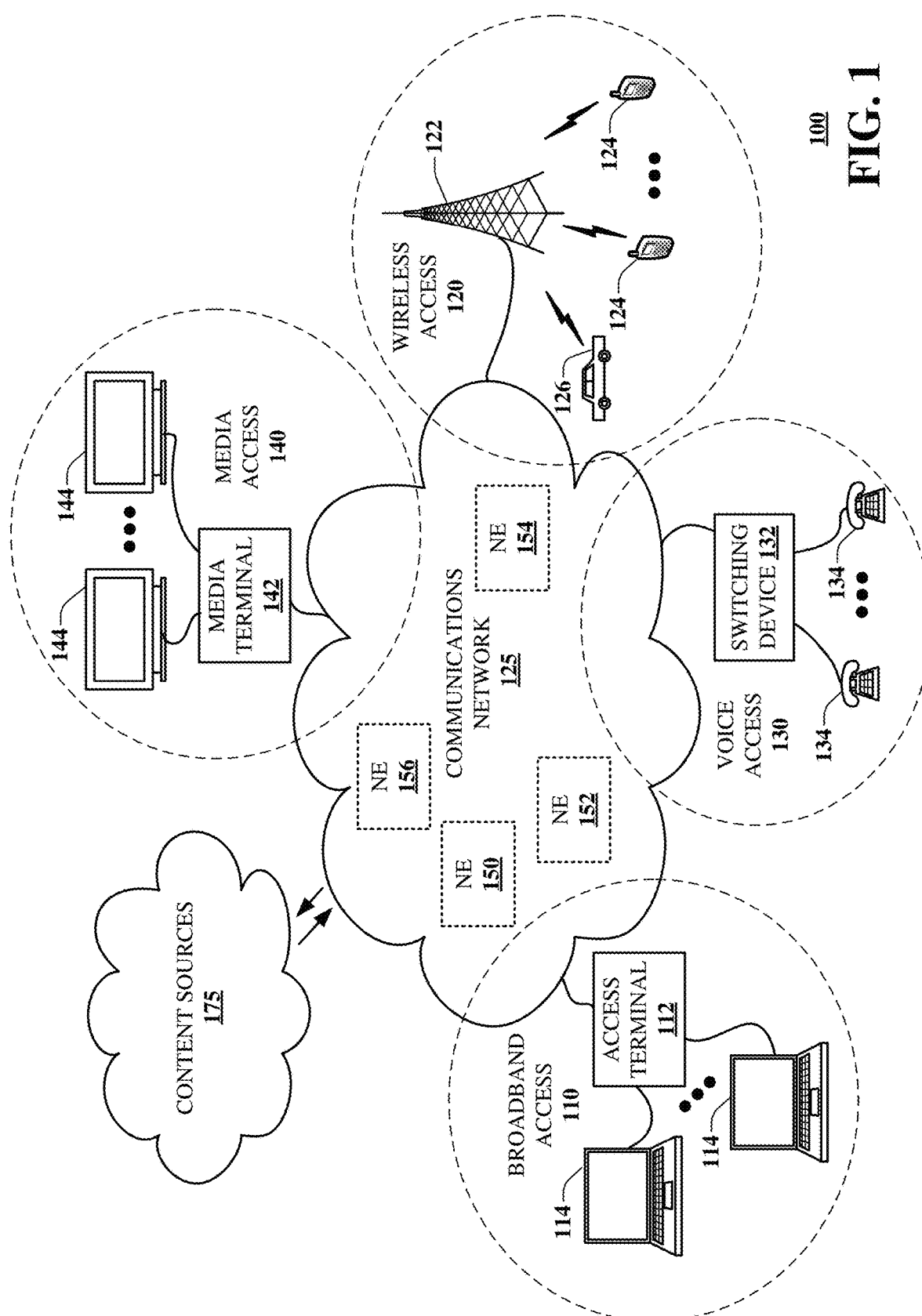
FIG. 1 is a block diagram illustrating an exemplary, non-limiting embodiment of a communications network in accordance with various aspects described herein.

The subject disclosure describes, among other things, illustrative embodiments for selecting a target cell for handover of radio communication with a source cell using carrier aggregation to communicate with user equipment. Handover may occur if the total bandwidth from all carriers of the target cell exceeds the total bandwidth of all the carriers from the source cell, if the majority of bandwidth from the carriers at the target cell has a Reference Signal Received Power (RSRP) that is better than the RSRP for carriers of the source cell, and if the majority of bandwidth from the carriers at the target cell has a Signal to Noise Ratio (SNR) that is better than the SNR for carriers of the source cell. Other embodiments are described in the subject disclosure.

One or more aspects of the subject disclosure include selecting, at a network element of a wireless communication network, a neighboring cell as a handover candidate to begin communication as a target cell with a user equipment (UE) device, the UE device currently communicating with a source cell of the wireless communication network, wherein the source cell includes a source group of cells including a source primary cell (PCell) and one or more source secondary cells (SCells), wherein the UE device receives a respective source carrier from each respective cell of the source group of cells in a carrier aggregation arrangement, wherein the neighboring cell includes a target group of cells including a target PCell and one or more target SCells, and wherein the UE device is configured to receive a respective target carrier from each respective cell of the target group of cells following a handover of communication from the source cell to the target cell. Aspects of the subject disclosure further include determining a total source bandwidth, wherein the total source bandwidth includes a sum of respective bandwidth values of each respective source carrier, determining a total target bandwidth, wherein the total target bandwidth includes a sum of respective bandwidth values of each respective target carrier, determining, for each respective source carrier, a respective Reference Signal Received Power (RSRP) value and a respective Signal to Noise Ratio (SNR) value, and determining, for each respective target carrier, a respective RSRP value and a respective SNR value. Aspects of the subject disclosure further include identifying, as an improved RSRP target carrier, each respective target carrier having a respective RSRP value exceeding a respective RSRP value for a respective source carrier by a predetermined RSRP threshold, identifying, as an improved SNR target carrier, each respective target carrier having a respective SNR value exceeding a respective SNR value for a respective source carrier by a predetermined SNR threshold, combining respective bandwidth values of each improved RSRP target carrier, forming an improved RSRP carrier bandwidth and combining respective bandwidth values of each improved SNR target carrier, forming an improved SNR carrier bandwidth. Aspects of the subject disclosure further include comparing the RSRP carrier bandwidth with a carrier RSRP handover threshold, comparing the SNR carrier bandwidth with a carrier SNR handover threshold, and initiating the handover of communication from the source cell to the target cell, wherein the initiating the handover is responsive to the RSRP carrier bandwidth exceeding the RSRP handover threshold, and the SNR carrier bandwidth exceeding the SNR handover threshold.

One or more aspects of the subject disclosure include selecting, at a source cell serving a user equipment (UE) device in a wireless network, a target cell for a handover of communication with the UE device, wherein the source cell includes a source group of cells including a source primary cell (PCell) and one or more source secondary cells (SCells), wherein the source cell transmits to the UE device a plurality of source carriers, each respective source carrier transmitted from a respective cell of the source group of cells in a carrier aggregation arrangement, wherein the target cell includes a target group of cells including a target PCell and one or more target SCells, and wherein the target cell is configured to transmit to the UE device a plurality of target carriers, each respective target carrier of the plurality of target carriers transmitted from a respective cell of the target group of cells following a handover of communication from the source cell to the target cell. Aspects of the subject disclosure further include determining, for each respective source carrier, a respective source Reference Signal Received Power (RSRP) value and a respective source Signal to Noise Ratio (SNR) value, determining, for each respective target carrier, a respective target RSRP value and a respective target SNR value, identifying, as an improved RSRP target carrier, all respective target carriers having a respective target RSRP value exceeding a respective source RSRP value for a respective source carrier by a predetermined RSRP threshold, and identifying, as an improved SNR target carrier, all respective target carrier having a respective target SNR value exceeding a respective source SNR value for a respective source carrier by a predetermined SNR threshold. Aspects of the subject disclosure further include summing respective bandwidth values of each improved RSRP target carrier, forming an improved RSRP carrier bandwidth amount, summing respective bandwidth values of each improved SNR target carrier, forming an improved SNR carrier bandwidth amount, and initiating the handover of communication from the source cell to the target cell, wherein the initiating the handover is responsive to the RSRP carrier bandwidth amount exceeding a RSRP handover threshold, and the SNR carrier bandwidth amount exceeding a SNR handover threshold.

One or more aspects of the subject disclosure include determining a Reference Signal Received Power (RSRP) and a Signal to Noise Ratio (SNR) for a plurality of carriers at a user equipment (UE) device, the plurality of carriers transmitted by a source group of cells including a source primary cell (PCell) and one or more source secondary cells (SCells) associated with the source PCell, and initiating a handover of communication with the UE device from the source group of cells to a target group of cells, wherein the target group of cells includes a target PCell and one or more target SCells, wherein the initiating the handover is responsive to the RSRP exceeding a predetermined RSRP threshold and the SNR exceeding a predetermined SNR threshold.

Referring now to FIG. 1, a block diagram is shown illustrating an example, non-limiting embodiment of a system 100 in accordance with various aspects described herein. For example, system 100 can facilitate in whole or in part selecting a target cell in a wireless network for handover from a source cell using carrier aggregation to communicate with user equipment based on total bandwidth of the carriers, Reference Signal Received Power (RSRP) and Signal to Noise Ratio (SNR) for the carriers. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
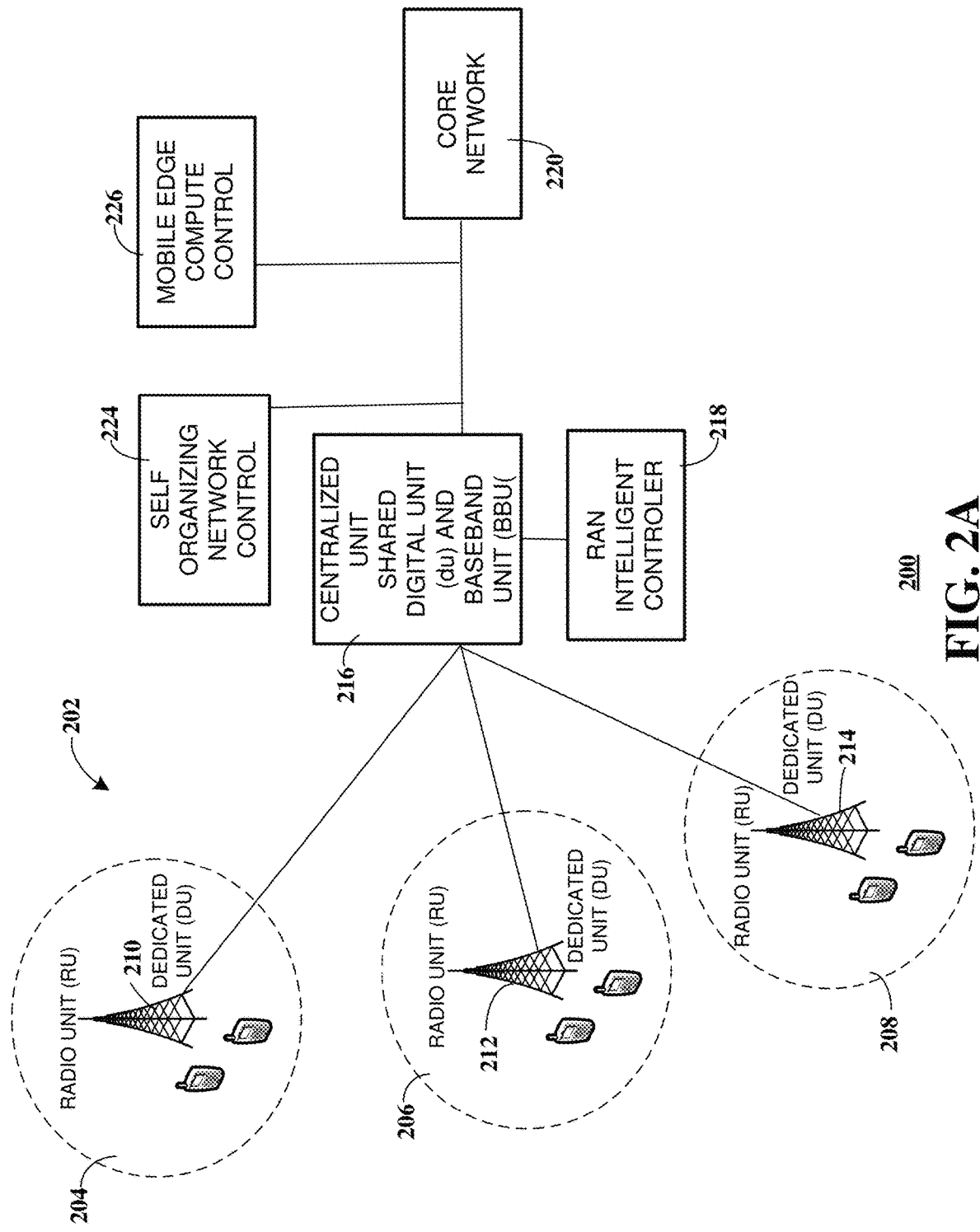
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a radio communication network 200 functioning within the communication network 125 of FIG. 1 in accordance with various aspects described herein. The radio communication network 200 is an exemplary embodiment of a network for radio communication among fixed parts such as base stations or access points and portable parts such as mobile devices.

Embodiments may have particular application in a radio communication system such as a cellular communication system. Such a system generally includes a plurality of cells in which each respective cell provides telecommunication service to a respective geographic area. In FIG. 1, wireless access 120 is an example of providing radio communication to a plurality of mobile devices 124 and vehicle 126 via base station or access point 122, The base station or wireless access 120 provides telecommunication service to compatible equipment in the geographic area served by the base station or wireless access 120. A cellular communication system may include a plurality of contiguous cells, each cell including a base station or access point 122 serving an assigned area. The base station or access point 122 provides radio communication services to mobile phones other devices in a cell. Such a cellular communication system may be referred to as a mobile communication system. As a mobile phone or other device moves from a first cell to an adjacent cell, radio communication with a particular base station or access point 122 is handed off to a target base station or access point serving the adjacent cell in a process known as handoff or handover.

The radio communication system may be a radio access network (RAN) which provides radio communication services to user equipment (UE) devices within a geographic area. The RAN may include a plurality of access points or base stations. The access points or base stations may be referred to as a Node B or evolved Node B or eNodeB or eNB or gNodeB or gNB or other names. The RAN may be in communication with a core network (CN) for connection to other communication services and for managing tasks such as UE registration and handoff. Each RAN operates according to a radio access technology. Examples of such radio access technologies include fifth generation cellular (5G), fourth generation cellular (4G) or Long-term Evolution (LTE), third generation cellular (3G), Universal Mobile Telecommunication System (UMTS), Evolved Universal Mobile Telecommunications System Terrestrial Radio Access Network (E-UTRAN) and others as well. E-UTRA is the radio access component of an LTE network. LTE is 3GPP's implementation of the International Telecommunication Union (ITU) 4G requirements. Other examples of such radio access technologies include technologies and protocols to be developed in the future. The UE operates according to complementary radio access technology. The UE may be referred to as a mobile station (MS), portable part (PP) or new radio (NR) module, for example, The radio communication network 200 in the exemplary embodiment of FIG. 2A includes three cells including a first cell 204, a second cell 206 and a third cell 208, a centralized unit (CU) 216, a radio access network (RAN) intelligent controller 218, and a core network 220. The first cell 204 is served by a first base station or first radio unit (RU) and remote dedicated unit or distributed unit (DU) 210 including a first baseband unit (BBU). The second cell 206 is served by a base station or second radio unit (RU) and remote dedicated unit or second distributed unit (DU) 212 including a second baseband unit (BBU). The third cell 208 is served by a third base station or third radio unit (RU) and remoted dedicated unit or distributed unit (DU) 214, including a third baseband unit (BBU). The CU 216 is in data communication with the core network 220.

In particular embodiments, a DU can either be located at the same network location as an RU or at a location that is remote from RU. Locating the DU remotely from the RU may be preferred currently in cloud-based solutions for DU topology. A shared BBU pool may conserve BBU resources compared to a dedicated DU. For example, if during a particular time, a cell is not using a dedicated DU, other cells can make use of the shared DU from the pool.

The three cells including the first cell 204, the second cell 206 and the third cell 208 together form a cluster 202. Each respective cell may be termed a network node. Each network node provides radio access to remaining portions of the network such as the core network 220. The structure and connection of radio communication network 200 is exemplary only. The radio communication network 200 may include any number of cells and base stations and other network components in data communication.

In the exemplary embodiment of FIG. 2A, the cluster 202 includes three cells. Particular embodiments may include any suitable number of cells in cluster 202, depending on network requirements, traffic levels and other factors. In typical embodiment, the cluster 202 may include dozens or hundreds of cells. Also, the number of cells in the cluster 202 may vary over time as network usage and build-out change and develop. For example, if the first cell 204 is divided into multiple smaller cells to manage increasing traffic levels, the smaller cells may be added to the cluster 202, increasing the number of cells in the cluster 202.

The radio communication network 200 implements a RAN using radio access technology. In the illustrated example, Third Generation Partnership Project (3GPP) NR 5G cellular network technology is implemented in the radio communication network 200. However, any suitable radio access technology now known or later developed, such as LTE or LTE-Advanced, may be selected and implemented. Various radio access technologies may be combined and interoperate in the radio communication network 200. As noted, the cluster 202 may include any suitable number of cells and it is anticipated that the cluster 202 will include a large number of cells, such as 100 cells served by 100 respective DUs.

The RU AND DU with dedicated BBUs 210, 212, 214 are logical network nodes that perform a subset of base station functions. An eNodeB forms the base station in LTE network devices. Each respective RU and DU with dedicated BBU provides mobile radio communication service to user equipment (UE) devices located in the respective cell served by the respective RU and DU with dedicated BBU. In the example of FIG. 2A, each respective RU and DU with dedicated BBU 210, 212, 214 is one DU of the cluster 202 of DUs serving respective geographically contiguous areas defined by the respective cells including first cell 204, second cell 206, and third cell 208 and operating substantially synchronously so that uplink transmissions are substantially synchronous among the DUs 210, 212, 214 of the cluster 202 and downlink transmissions are substantially synchronous among the DUs 210, 212, 214 of the cluster 202 to limit inter-cell interference.

Each RU and DU with dedicated BBU of the radio communication network 200, including first RU and DU with dedicated BBU 210, second RU and DU with dedicated BBU 212 and third RU and DU with dedicated BBU 214, is in communication with the CU 216. In some embodiments, each respective RU and DU with dedicated BBU is a remote radio head (RRH) or remote radio unit (RRU), providing radio frequency (RF) communication with UE in each respective cell. Each RU and DU with dedicated BBU, including first RU and DU with dedicated BBU 210, second RU and DU with dedicated BBU 212 and third RU and DU with dedicated BBU 214, may communicate with the CU 216 using fiber optic cable or other means of data communication.

The CU 216 provides control of the respective RU and DU with dedicated BBUs in the radio communication network 200. The CU 216 is a logical network node that performs a subset of base station or eNodeB functions. Such functions may include transfer of user data, mobility control, radio access network sharing, positioning, session management, for example. The CU 216 provides baseband central control. The CU 216 generally controls the respective RU and DU with dedicated BBUs. The split of functionality between the CU 216 and RU and DU with dedicated BBUs such as RU and DU with dedicated BBU 210, RU and DU with dedicated BBU 212, and RU and DU with dedicated BBU 214, is established by the network operator of the radio communication network 200. Some embodiments may omit the CU 216 and provide direct control of a base station or an eNodeB or gNodeB at each RU and DU with dedicated BBU 210, 212, 214.

The CU 216 operates in conjunction with the RIC 218. The RIC 218 is a network node that controls certain aspects of the radio communication network 200. The RIC 218 provides access to some functions of the radio communication network 200. The RIC 218 may control operation of the CU 216 and respective DUs in the radio communication network 200.

In the illustrated embodiment, the radio communication network 200 includes a self-organizing network control module 224 and a mobile edge compute control 226. The self-organizing network control module 224 may control implementation of a self-organizing network in the radio communication network 200. A self-organizing network (SON) may include automation technology to make the planning, configuration, management, optimization and healing of mobile radio access networks simpler and faster to achieve. In a self-organizing network, newly added base stations may be self-configured. Currently operating base stations will self-optimize. The self-organizing operation may be coordinated or controlled by the self-organizing network control module 224. The self-organizing network control module 224 may be in communication with other elements of the radio communication network 200. The self-organizing network control module 224 collects network information and performs suitable analysis. Mobile edge computing, or multi-access edge compute (MEC) enables cloud computing capabilities at the edge of a cellular network such as the network formed by the cluster 202. By running applications and performing related processing tasks closer to the cellular customer, network congestion may be reduced and applications may perform better. MEC technology may be implemented at the cellular base stations or other edge nodes, and may enable flexible and rapid deployment of new applications and services for customers.

Communication between a UE device and a base station is conducted using carrier signals of specified frequency. Each base station may use multiple carriers or bands of frequencies to communicate with multiple UE devices in a cell. Each carrier may be referred to as a channel and may have individual channel characteristics besides frequency.

In some cases, multiple carriers may be combined or aggregated for communication between a UE device and a base station. Carrier aggregation (CA) is used in some radio access technologies such as LTE-Advanced and 5G in order to increase the communication bandwidth. Increasing bandwidth increases the bitrate of communication between a UE device and a base station such as eNodeB or gNodeB. In LTE Advanced and 5G systems, carrier aggregation (CA) is a technique used to enable the very high data rates of 4G and 5G cellular communication to be achieved. By combining more than one carrier together, either in the same or different bands, it is possible to increase the bandwidth available and, in this way, increase the capacity of the link between the UE device and the base station. Further, CA enables use of available radio spectrum to be maximized. Often, frequency bands of available spectrum are relatively small as the availability of spectrum is limited. Spectrum assignment may be made by government or other entities and may make available only small bands. Carrier aggregation seeks to be able to utilize both small bands and large bands more effectively and efficiently.

Carrier aggregation may be used in both Frequency Division Duplex (FDD) and Time Division Duplex (TDD) modes. In carrier aggregation, multiple frequency blocks, called component carriers, are assigned to the same user or UE device. 3GPP release-10 supports up to two Component Carriers (CCs) in a downlink (DL) and one CC in an uplink (UL). The maximum possible data rate per user is increased as more frequency blocks are assigned to a user. 3GPP release 12 allows 3 CCs in the downlink and 2 CCs in the uplink. Other systems and implementations may specify other arrangements including up to 7 CCs in each LTE downlink and uplink and significantly more in 5G.

Carrier aggregation allows mobile network operators to combine a number of separate LTE or 5G carriers. This enables the network operators to increase peak user data rates and overall capacity of their networks and to exploit fragmented spectrum allocations. Carrier aggregation can be used to combine carriers whether they are contiguous or even in the same frequency band.

Carrier aggregation can generally be used to increase throughput. Throughput refers to the actual amount of data or information that is successfully communicated over a communication link, such as between a UE device and the network. Throughput may be measured in Mbps or similar units. Carrier aggregation is usually configured with collocated cells operating in the same frequency band, which provide similar coverage. Conversely, carrier aggregation can also be configured on non-collocated cells with partial coverage overlap.

Carrier Aggregation (CA) and handover (HO) are among the most fundamental features of wireless networks. CA assigns multiple carriers to a single mobile device, for example to improve data throughput. CA availability in networks began with LTE networks and plays a critical role in 5G networks and will be important in future mobile network technology. Generally, the carriers in CA include one Primary Cell (PCell) and one or more (currently up to six) Secondary Cells (SCells). A UE device communicates over a carrier from the PCell and one or more carriers from the SCells.

Handover is designed for UE devices to attach to the best cell among many neighbors, particularly when the UE devices are mobile and moving among cellular coverage areas. As a UE device moves from one cell coverage area to another, communication with the UE device will be handed over from one or more carriers of the source cell to one or more carriers of the target cell. Also, as the radio condition seen by a UE device of a cell changes, the UE device may find a better cell, with better radio condition, to hand over to. Radio condition may refer to any factor or combination of factors which may affect the reliability and efficiency of radio communication in a radio network, such as interference at frequencies of interest, traffic congestion, fading, and others. For example, different frequency bands have different propagation characteristics and use different antenna height, azimuth, and tilt angle.

Handover in a CA-enabled network currently takes into consideration the radio condition of a PCell only. A handover procedure generally relies largely or solely on Reference Signal Received Power (RSRP) when making handover decisions. RSRP is a measure of received signal power in an LTE network or other network. RSRP is the power of the LTE reference signals spread over the full bandwidth and narrowband. Reference signals are transmitted on physical layer of the downlink and are used by the UE device to determine downlink power level and for channel estimation. RSRP is the linear average over the power contribution of the resource elements that carry cell-specific reference signals. RSRP is used, for example, in 4G LTE networks for measuring and indicating received signal strength at the UE device, for selecting a cell to attach to and for handover. In some instances, Reference Signal Received Quality (RSRQ) is also used to evaluate handover. RSRQ is a measure of signal quality of the cellular connection between a cell and the UE device. RSRP and RSRQ allow the base station or eNodeB or gNodeB to receive a report from the UE device of actual power level or quality level received by the UE device to develop an understanding of channel conditions. This information can be used to determine other factors such as modulation scheme.

A UE device will hand over from a current cell, also referred to as a source cell, to a better PCell, referred to as the target cell, when performance indicators such as RSRP are better for the target PCell than for the source PCell. This is true also in the case of carrier aggregation, where the UE device is on a carrier from a PCell and a carrier from one or more SCells. However, when SCells are not considered in the handover analysis, a device that hands over to a better, target PCell may end up aggregating carriers from fewer SCells or SCells with poorer performance. For example, signal strength or signal quality might be worse from the SCells after handover, due to noise, fading or other interference. The overall performance experienced by the UE device on after handover to the source (PCell plus SCells if available) to the target (Pcell plus SCells if available) may degrade as a result.

New radio (5G NR) technologies include beamforming for radio transmission. Beamforming is the use of multiple radiating antenna elements which transmit the same signal at an identical wavelength and phase. The multiple radiating antenna elements combine to create a single antenna with a longer, more targeted beam which is formed by reinforcing the waves in a specific direction. Previous antennas provided, for example, 120 degrees of coverage to a sector in the area around the cell. A beamforming antenna can provide a very narrow beam of just a few degrees width. The beam conveys high power and signal strength and has a relatively high signal to noise ratio.

While RSRP has been the standard parameter to trigger HO in conventional wireless networks, it may be a poor indicator of radio condition for beamforming bands in 5G networks. Signal to noise ratio (SNR) in some applications may be a better indicator for beamforming bands. SNR is the difference between the received signal and background noise at a receiver on a radio channel. In fact, it has been observed in the field that 5G SCells using beamforming bands tend to enjoy better SNR but lower RSRP than PCells on frequency bands below 3 GHz, referred to as Sub3 bands. In a beam, signal power may be more concentrated so the signal to noise ratio may be relatively higher compared to RSRP for a beam.

Channel bandwidth (BW) is also an important consideration of carrier aggregation and handover. Channel bandwidth corresponds to the measured width of the radio frequency band that carries data, or the capacity of the network for data transfer. For example, a HO to a target cell with improved RSRP or other performance parameters, but with less BW, could result in a radio connection with the target cell that is degraded relative to the radio connection to the source cell. Bandwidth refers to total carrier bandwidth for carriers received at a UE device. For example, if a UE device is communicating with a source cell using three component carriers (CC), the UE device may see a total bandwidth of 60 MHz if each carrier has a bandwidth of 20 MHz. If the UE device hands over to a cell using 5 CC, if each carrier has a bandwidth of 10 MHZ, the total bandwidth seen by the UE device decreases from 60 MHz to 50 MHz.

At any location in a wireless network, the radio condition of a PCell and SCells can be significantly different. Radio condition refers to any factor or combination of factors which may affect the reliability of radio communication in a radio network, such as interference at frequencies of interest, traffic congestion, fading, and others. For example, different frequency bands have different propagation characteristics and use different antenna height, azimuth, and tilt angle. Further, the physical environment of each respective cell, including buildings and other features of the terrain, can vary widely between the PCell and the SCells.

Conventional wireless networks support aggregation of up to seven carriers, referred to as 7CC CA, which includes one PCell and six SCells. Generally, use of more carriers to a single UE device corresponds to greater data throughput. Throughput refers to the rate of successful delivery of data or packets or messages and is generally measured in bits per second or packets per second. When only the radio condition of the PCell is considered and the radio condition of each of the SCells is ignored, a handover may connect the UE device to a target cell with lower overall throughput.

In current advanced 5G networks, an SCell may operate on the C-band or mmWave bands of frequencies. Both frequency bands offer much higher throughput than 5G Sub-3 bands due to much wider bandwidth available in C-band (3.7 to 3.98 GHz) and mmWave band (above 24 GHz). When the handover decision is made solely by comparing the source PCell and target PCell, the device generally ends up in worse radio condition if neither C-band nor mmWave band is available at an SCell for the target PCell. Instead of an SCell operation on C-band or mmWave band, as before the handover, the SCell after handover operates on the smaller bandwidth sub-3 band.

A conventional handover decision is made by comparing RSRP between the source PCell and the target Pcell for the UE device. A handover offset is determined as the difference between the RSRP for signals received from the target cell and RSRP for signals received from the source cell. The handover offset, measured, for example, in units of dB, may be compared with a handover threshold. If the handover offset exceeds the handover threshold, a handover routine may be initiated. Since RSRP may not be a reliable indicator of radio performance of beamforming bands in 5G networks, a handover decision made based solely on RSRP for the PCell may send the device to a target with worse performance than the source.

In some applications, handover is based on a measurement report from the UE device. The 3GPP standard defines several predefined measurement report mechanisms to be performed by the UE device. One of this is referred to as event A6 and has been introduced into advanced 5G networks. Event A6 happens when a neighbor SCell has better signal strength or signal quality than the serving SCell by a predefined offset value. In an example, signal strength or signal quality may be measured by RSRP, for example. However, handover based on event A6 needs two steps for completion. First, the PCell must be handed over from the source cell to the target cell. Then, each of the source SCells must be handed over to target SCells. If the carrier aggregation arrangement includes several SCells, several steps are needed in the operation to hand over all the SCells. Some operators disable event A6-based handover because SCells could be from different cell sites. If the target PCell and the target SCells are on different networks, such as on different paths in an X2 network between the PCell and the cellular core network and the SCells and the core network, the different paths may cause additional data communication delay. X2 is an interconnecting interface between two base stations or eNodeB or gNodeB nodes in a network. Without event A6-based handover, UE devices may not be able to take advantage of a beamforming carrier (C-band or mmWave band) from a neighboring cell.

Thus, in earlier generations of cellular technology, handover was completed using a single carrier from a source cell to a target cell. As the number of carriers seen by a UE device has increased due to CA and other developments, the challenge has been to determine which of those carriers to use to determine handover. In current and future generations of cellular technology, multiple carriers are aggregated at a UE device, so handover becomes more complicated. A UE device has carriers from a PCell and one or more SCells. If the UE device seeks to hand over to another cell, the current default implementation is to use the PCell to determine when to hand over and to which target PCell. The PCell is providing signaling, but most of the traffic communicated to the UE device is conveyed on the SCells, which use C-band and mmWave bands, which are much wider bandwidth than the Sub-3 band used by the PCell. Further, the performance indicator used to evaluate handover is RSRP. A value of RSRP for the source cell is compared with the value of RSRP for target cells and, when a threshold is exceeded, the handover is initiated. However, SNR may provide a better handover performance indicator for beamforming carriers. Event A6-based handover has not been implemented because it currently represents an impractical solution.

In an improved system and method, carrier aggregation and handover are considered synergistically. Handover decisions do not only consider the radio condition of a PCell of a source cell and a PCell of one or more target cells. The handover decisions also consider radio connections with SCells and the total bandwidth seen by the UE device under carrier aggregation. In addition, both RSRP and SNR may be used as a handover threshold. The system and method improve the overall performance of any carrier aggregation-enabled network.

In an embodiment, handover may be controlled based on total bandwidth available to a UE device at a target. Further, handover may be controlled by evaluation consider not only RSRP from the target cell but also SNR from the target cell.

Figure 2B:
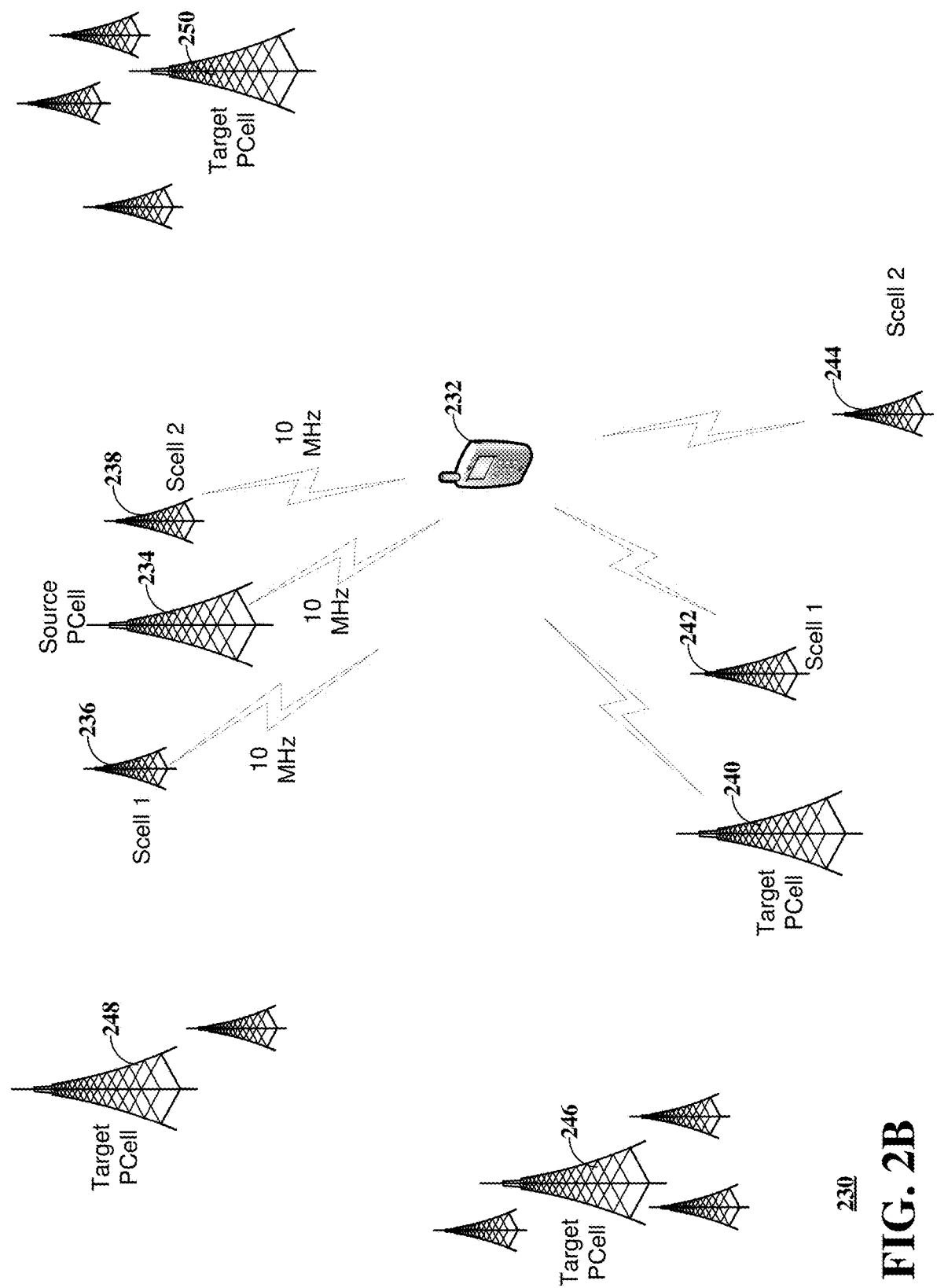
FIG. 2B depicts an illustrative embodiment of a radio communication network in accordance with various aspects described herein.

FIG. 2B depicts an illustrative embodiment of a radio communication network 230 in accordance with various aspects described herein. A UE device 232 in the network 230 is attached to a source PCell 234. In addition, by carrier aggregation, the UE device receives data from a first SCell 236 and a second SCell 238. The network 230 in this example further includes other cells including a first target PCell 240 and, associated therewith, a first SCell 242 and a second SCell 244, a second target PCell 246 and associated SCells, a third target PCell 248 and associated SCells, and a fourth target PCell 250 and associated SCells. The configuration of the network 230 is intended to be exemplary only. Other devices including other UE devices will be present and cooperate with the devices illustrated in FIG. 2B.

In general, each PCell an eNodeB or a gNodeB, or a combination of these. The associated SCells cooperate with a PCell to provide services including high throughput data to the UE device 232. The source PCell 234 provides signaling including control information to the UE device 232. The source PCell 234 may operate on any suitable frequency band such as a Sub-3 GHz band in a 5G cellular system. The first SCell 236 and the second SCell 238 may operate on wider bandwidth systems such as C-band and mmWave 5G cellular systems. The UE device aggregates carriers from the source PCell 234, the first SCell 236 and the second SCell 238. The wider bandwidth of the SCells allows improved throughput to the UE device 232.

In the illustrated example, the UE device 232 sees a total of 30 MHZ of bandwidth. This includes 10 MHz bandwidth from the source PCell 234, 10 MHz of bandwidth from the first SCell 236 and 10 MHz of bandwidth from the second SCell 238. Bandwidth assigned to a particular carrier of a particular PCell or a particular SCell depends on spectrum availability. Generally, bandwidth is assigned to a carrier for communication by an SCell or a PCell with a UE device in increments of 5 MHz, 10 MHz or 20 MHz.

Any suitable number of SCells may be combined with the source PCell 234 for carrier aggregation. FIG. 2B illustrates a 3 CC arrangement. Current specifications permit up to a 7 CC arrangement in LTE and significantly more under 5G. In some examples, one or more SCell devices is collocated with a PCell, such as an LTE eNodeB of the PCell collocated at a common cell site with a 5G mmWave gNodeB operating as an SCell. The SCells and the PCell may communicate via an X2 link if not on the same base station for communication, or may communicate through a core network not shown in FIG. 2B.

In FIG. 2B, the UE device 232 may attempt to hand over from the source PCell 234 to another PCell, including any of target PCell 240, second target PCell 246 and third target PCell 248 and fourth target PCell 250. The UE device identifies one or more potential target PCells for a handover. The UE device measures a value of RSRP from the source PCell and SCells associated with the source PCell. The UE device further determines a value of RSRP from one or more target PCells and SCells associated with a target PCell that may be available for handover, Similarly, the UE device determines a value of SNR from the source PCell and its associated SCells and a value of SNR from the one or more target PCells and their associated SCells, The base station serving the source cells initiate the handover of UE device 232 from the source to the target when both the RSRP condition and the SNR conditions are met.

Unlike conventional networks which rely on RSRP of the PCells only, the apparatus and procedure in accordance with various aspects herein operates to compare RSRP between the source cells and the target cells, and also to compare SNR between the source cells and the target cells. As summarized above, both RSRP and SNR are considered for handover on both PCell and SCell(s).

Further unlike conventional networks, the apparatus and procedure employ a bandwidth (BW) factor to achieve a more comprehensive estimation between source PCell and target PCell. The UE device 232 sees a specified source bandwidth from the source PCell and a source bandwidth from each of the source SCells. Adding these respective source bandwidths, the UE device sees a total source bandwidth from the source PCell and source SCells as the sum of the respective source bandwidths. As it considers a potential target PCell for handover, the UE device sees a target bandwidth from the target PCell and the UE device sees a target bandwidth from each of the target SCells associated with the target PCell. Adding these respective target bandwidths, the UE device sees a total target bandwidth from the target PCell and the target SCells as the sum of the respective target bandwidths.

Figure 2C:
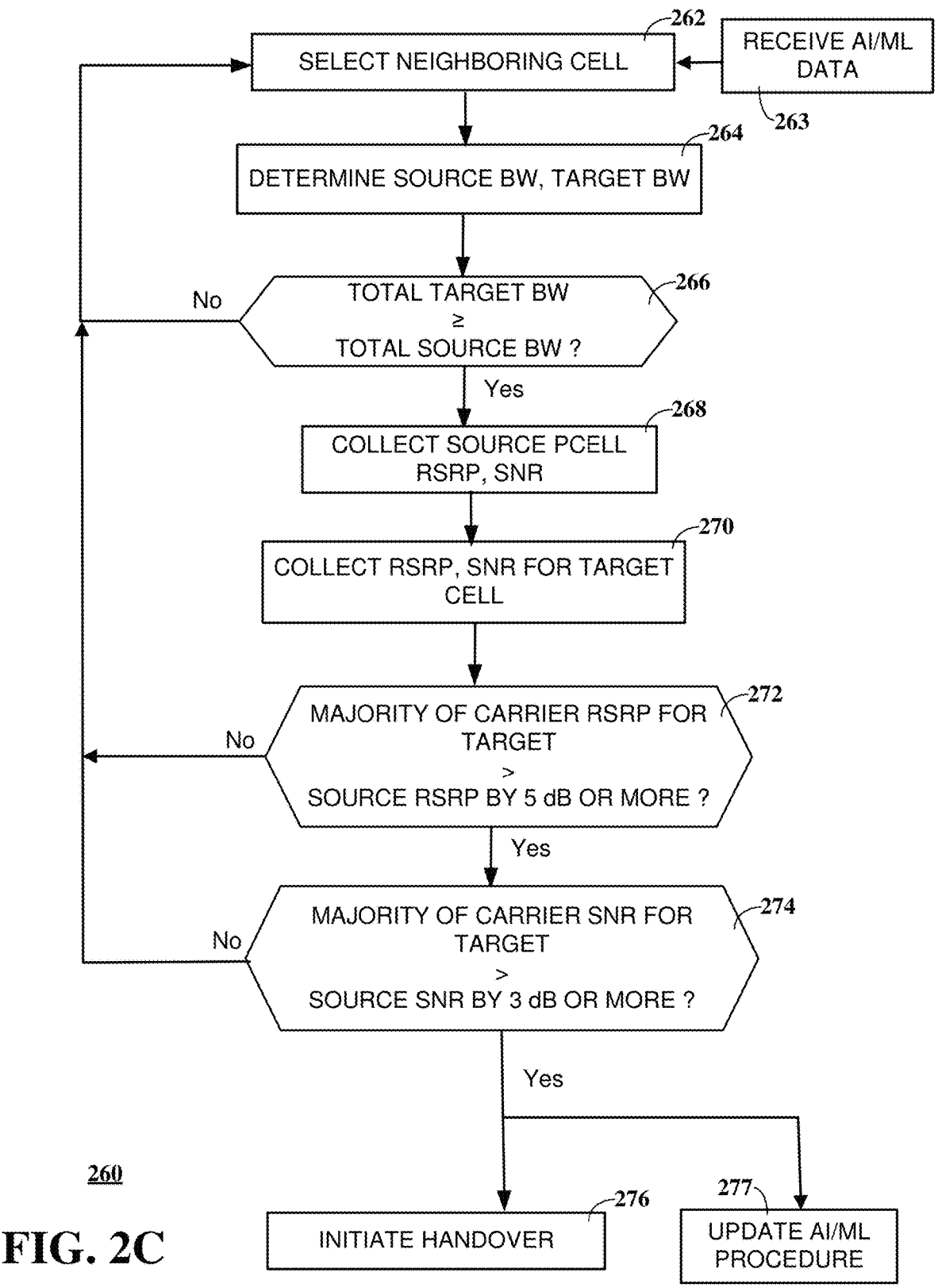
FIG. 2C depicts an illustrative embodiment of a method in accordance with various aspects described herein.

Further unlike conventional networks, the apparatus and procedure combine a bandwidth (BW) factor and signal strength factors to achieve a more comprehensive estimation between source PCell and target PCell. In embodiments, the apparatus and procedure use RSRP of the source PCell target PCell and SNR of the source SCells and SNR of the target SCells as the signal strength factors. More particularly, for the target PCell, the majority of the FIG. 2C depicts an illustrative embodiment of a method 260 in accordance with various aspects described herein. The method 260 may be used in a wireless communication network, such as a 5G cellular network, to identify a cell for handover of communication from a source cell, which currently serves a UE device, to a target cell which offers better radio conditions for the UE device. In an exemplary embodiment, the handover is from a source group of cells, including a PCell and one or more SCells, to a target group of cells including a PCell and one or more SCells. In general the source group and the target group include the same number and mix of cells. The UE device aggregates carriers from the cells of the source group and needs to move those carriers to the cells of the target group. The method 260 identifies a target group of cells to which the communication of the UE device can be handed over.

Any of the carriers can originate from a different cell or network element. A typical 5G network has several different spectrum portions deployed on the network, including sub-3, C-band and mmWave portions. The source cell may have any combination of frequency bands available for use. However, the target cell may not have exactly the same combination of frequency bands available for the UE device. Each cell of the source cells and target cells has a clear definition of the PCell and any SCells, including SCells identified as SCell1, SCell2, SCell3, SCell4, etc. The procedure must compare the target PCell with the source PCell, the target SCell1 with the source SCell1, the target SCell2 with the source SCell2, etc. The individual respective cells do not need to share the identical frequency bands or spectrum portions.

The method 260 needs to take into consideration the contribution from the carriers from all (three) cells (PCell, SCell1 and SCell2). All have the same bandwidth, so, for the target, at least two of three of the carriers (more than 50%) should have better RSRP if the handover is made. As long as two of the three carriers, from the PCell, SCell1 and SCell2, have better RSRP, the handover may go forward. If all three carriers are better or have improved RSRP, that may be the best situation. If only 1 carrier is better, the handover does not go forward, regardless of whether the better carrier is from the target PCell or one of the target SCells.

In addition, RSRP is not the only, and probably not the best, threshold indicator for handover. In many situations, SNR is as important to handover. Therefore, add a second condition for handover. The procedure should evaluate SNR difference in the same way as the procedure evaluates RSRP differences. As long as two of the three carriers, from the PCell, SCell1 and SCell2, have better SR, the handover may go forward.

Operation of the PCell, SCell1 and SCell2 may include beamforming for radio transmission. Beamforming is the use of multiple radiating antenna elements which transmit the same signal at an identical wavelength and phase. The multiple radiating antenna elements combine to create a single antenna with a longer, more targeted beam which is formed by reinforcing the waves in a specific direction. Previous antennas provided, for example, 120 degrees of coverage to a sector in the area around the cell. A beamforming antenna can provide a very narrow beam of just a few degrees width. The beam conveys high power and signal strength and has a relatively high signal to noise ratio (SNR).

Both the RSRP condition and the SNR condition must be met. Both the RSRP condition must improve and the SNR condition must improve for the handover to go forward. Further, one or more threshold values may be introduced for evaluating the improvement in RSRP or SNR. In embodiments, the RSRP for carriers of the target cell must be at least 5 dB better than the RSRP for the carriers of the source cell. Similarly, in embodiments the SNR for carriers of the target cell must be at least 3 dB better than the SNR for the carriers of the source cell. Any suitable threshold values, such as the RSRP threshold value of 5 dB and the SNR threshold value of 3 dB described in this example, may be used.

Further, the percentage of total bandwidth seen by the UE device 232 that should show an improved RSRP or SNR may be adjusted as appropriate. This percentage may be referred to as the required bandwidth-RSRP offset and the required bandwidth-SNR offset. In the example above in which the PCell and the two SCells provide one-third of the total source bandwidth seen by the UE device (10 MHz each for a total of 30 MHz), the required bandwidth-RSRP offset of two-thirds or 0.66 is met. The same is true for the required bandwidth-SNR offset; two-thirds of the total bandwidth, or 20 MHz of a total 30 MHz, has improved RSRP and improved SNR.

In different embodiments, the required bandwidth-RSRP offset required bandwidth-SNR offset may be adjusted together or separately to any suitable value. An initial value of 0.66 may be chosen and updated later. If the required bandwidth-RSRP offset and the required bandwidth-SNR offset are set a 0.5 or 50%, a handover will not be initiated because there will be no improvement. However, if an offset of 0.51 is met, there will be improvement from the handover but the slight improvement may not justify the overhead required in network signaling traffic and assignment and reassignment of network elements. There is a cost to performing a handover, and the cost increases with the number of carriers aggregated at the UE device. On the other hand, if the offset is close to 100%, indicating that all carriers are improved after the handover, the network should definitely hand over the connection to the UE device. Accordingly, the required bandwidth-RSRP offset and the required bandwidth-SNR offset may generally be set at any suitable value between 0.51 and 1.00.

Further, the threshold values may be modified over time. For example, an artificial intelligence or machine learning application (AI/ML) may be implemented to learn from the handover data over time and to control the handover process. Controlling the handover process includes aspects such as adjusting the RSRP threshold value and the SNR threshold value, if appropriate. The adjustment may be done automatically in response to the analysis of the AI/ML application. Similarly, the required bandwidth-RSRP offset and the required bandwidth-SNR offset may be adjusted in response to a machine learning process.

In a second example, the source bandwidth seen by the UE device 232 is different for the PCell, SCell1 and SCell1. In this example, the bandwidth from the PCell is 5 MHz, the bandwidth from the SCell1 is 5 MHz and the bandwidth from the second SCell2 is 20 MHz. In this example, the handover decision is driven by SCell 2. The bandwidth contribution from the PCell and SCell1 is just 10 MHz out of a total source bandwidth of 30 MHz. In this example, the SCell2 must improve because of its significant contribution to the total bandwidth. Even if the target cell has better RSRP (improved by 5 dB) and better SNR (improved by 3 dB) than the source cell, if either the RSRP or the SNR of the SCell2 is not improved, the UE device 232 cannot handover to that target cell.

Accordingly, the procedure does not consider just the number of carriers seen by the UE device 232 (two out of three or 66% for example), the procedure considers the required bandwidth-RSRP offset and the required bandwidth-SNR offset of the total bandwidth from all carriers combined. In the example, a 3 CA arrangement is described and the required bandwidth-RSRP offset and the required bandwidth-SNR offset are each set at 0.66. In other examples, 2CA, 4CA, 5CA and other arrangements, as long as 0.66 of the total bandwidth have better RSRP and SNR at the target cell, the handover may proceed. The 0.66 value for the required bandwidth-RSRP offset and the required bandwidth-SNR offset may be varied or selected to be any value, either as a network feature set by the network operator or as adjusted automatically by, for example, an AI/ML application.

In an embodiment, handover from a source to a target will occur under either a first scenario or a second scenario. According to the first scenario,
  a. The total bandwidth (BW) at Target is greater than or equal to the total BW at Source
  b. The majority of BW at Target passes an RSRP threshold test (the RSRP of Target is better than that of Source by 5 dB or more)
  c. The majority of BW at Target passes SNR threshold test (the SNR of Target is better than that of Source by 3 dB or more)

If all three conditions are not met, no handover from the source to the target will occur.
According to the second scenario,
  a. The BW of Pcell at Target has at least 50% of total BW at Source
  b. The Pcell at Target passes RSRP threshold test
  c. The Pcell at Target passes SNR threshold test If all three conditions of the second scenario are not met, no handover from the source to the target will occur.

Referring to FIG. 2C, at step 262, the method includes selecting a neighboring cell as a potential target cell for handover of communication with a UE device such as UE device 232 (FIG. 2B). The steps of the method may be performed by any suitable network element, such as the source base station or eNodeB or gNodeB that is currently serving the UE device. Generally, the source base station or eNodeB or gNodeB is in data communication with other network elements such as over an X2 application network. Respective network devices may share information such RSRP values and SNR values reported by UE devices including the UE device 232 and information about available network resources such as PCells and SCells of neighboring cells that can be combined to form a handover group.

At step 263, the method may include an optional step of receiving artificial intelligence/machine learning (AI/ML) data from an AI/ML application. The AI/ML application may be instantiated at any suitable network location, such as in one or more base stations or eNodeB or gNodeB devices, or in a core network element. The AI/ML application may be arranged to collect information about network operation, including handover operations among various combinations or groups of source cells and target cells, and success information about the relative success or failure of such handover operations. Further, the AI/ML application may apply a suitable process to learn from the collected information and develop conclusions about how future handover processes should be controlled. Those conclusions may be embodied as AI/ML data and may include information about threshold values, required bandwidth RSRP-offset values, required bandwidth SNR-offset values, and others. If available, such information may be received at any point in the process of method 260 including at step 262.

At step 264, the method 260 determines a total source bandwidth seen by the UE device and a total target bandwidth available for handover. In embodiments, a UE device such as UE device 232 is in radio communication with a source cell. In the example of FIG. 2B, the UE device 232 uses carrier aggregation to communicate with a source PCell 234, a first source SCell 236 and a second source SCell 238. In a typical embodiment, the source PCell 234 provides signaling communication for the UE device 232 on a downlink and receives the uplink from the UE device 232. The PCell 234 generally communicates on any suitable frequency band such as a sub-3 GHz band assigned to 5G cellular communications. The first SCell 236 and second SCell 238 generally communicate on relatively wide bandwidth frequency bands such as C-Band and mmWave bands assigned for 5G cellular communications. Each of the respective carriers from the source PCell 234, the first SCell 236 and the second SCell 238 has an assigned bandwidth, such as 10 MHz each, or 5 MHz from the source PCell 234, 5 MHz from the first SCell 236 and 20 MHz from the second SCell 238. The numbers of SCells and the assigned bandwidth amounts are exemplary only.

Step 264 also includes a process of locating a group of cells such as target PCell 240 first target SCell 242 and second target SCell 244 having available bandwidth for handover from the group including the source PCell 234, the first source SCell 236 and the second source SCell 238. The source PCell 234 may receive information about available PCells, SCells, bandwidth and other suitable information from any available source. In an example, the PCells communicate using an X2 network to convey such information.

At step 266, the method 260 includes a determination if the total target bandwidth at the neighboring cell selected at step 262 is greater than or equal to the total bandwidth currently assigned to the UE device in the source cell. For example, if the available bandwidth is not at least as large as the current bandwidth used, the neighboring cell is a poor candidate for handover. Total bandwidth for the source cell is the sum of the bandwidth assigned to the source PCell and the bandwidth assigned to any associated SCells. In the example illustrated in FIG. 2B, total source bandwidth includes 10 MHz for the source PCell 234, 10 MHz for the first source SCell 236 and 10 MHz for the second source SCell 238, or a total source bandwidth of 30 MHz. These values are exemplary only. If the total BW test of step 266 fails, control returns to step 262 to select another neighboring cell for evaluation for handover.

At step 268, information about RSRP and SNR values for the source cell is collected. For example the UE device that is being evaluated for handover reports the RSRP value and the SNR value it determines for each carrier received by the UE device. Any suitable method may be used to determine and report these values. Values for each carrier that is aggregated by the UE device are collected. Moreover, other radio channel information or parameters in addition to or instead of RSRP and SNR may be evaluated and used as well.

At step 270, information about RSRP and SNR values for the target cell is collected as well. For example, a base station such as an eNodeB or gNodeB of a PCell that is performing the method 260 may obtain target cell RSRP, SNR and other radio channel information from any suitable source, such as the target PCell over an X2 network communication channel. Values for each carrier that would be aggregated by the UE device if the handover actually occurs are collected.

At step 272, the method 260 determines if the majority of carrier RSRP values for the group of cells of the target exceeds the carrier RSRP value. In the example of FIG. 2B, the RSRP value reported by the UE device 232 from the target PCell 240 is compared with the RSRP value reported by the UE device 232 from the source PCell 234. In embodiments, the comparison of step 272 may include RSRP values determined for other carriers aggregated by the UE device, including the carriers from any active SCells such as first SCell 236 and second SCell 238 in FIG. 2B. In embodiments, the carrier RSRP value for the target cell should exceed the carrier RSRP value for the source cell by a predetermined threshold. In the example, the predetermined threshold is 5 dB. In other embodiments, other threshold values may be used. Moreover, the threshold value may be varied in any suitable manner. For example, an AI/ML process may monitor network activity including handovers and may learn from the relative success and failure of such handovers. The AI/ML process may automatically adjust the threshold value used at step 272. If the test of step 272 fails control returns to step 262 to begin evaluation of another neighboring cells for possible handover.

At step 274, the method 260 determines if the majority of carrier SNR values for the group of cells of the target exceed carrier SNR values for the carriers of the group of cells forming the source. In the example of FIG. 2B, the SNR values of reported by the UE device 232 for the first target SCell 242 and the second target SCell 244 are compared with the SNR values for the first source SCell 236 and the first SCell 238. In embodiments, the carrier SNR value for the target cell should exceed the carrier SNR value for the source cell by a predetermined threshold. In the example, the predetermined threshold is 3 dB. In other embodiments, other threshold values may be used. Moreover, the threshold value may be varied in any suitable manner, such as by an AI/ML process. If the test of step 274 fails control returns to step 262 to begin evaluation of another neighboring cells for possible handover.

In step 272 and step 274, the percentage of carriers exceeding the RSRP threshold of 5 dB and the SNR threshold of 3 dB is specified as a majority of the carriers, measured by bandwidth seen at the UE device. Here, majority means exceeding fifty percent. In other applications, a different value than fifty percent may be specified, and different values may be specified for the RSRP threshold and the SNR threshold. Further, in embodiments employing an AI/ML application to learn from the historical application of the handover procedure, the AI/ML application or another input may specify the percentage of carriers exceeding the RSRP threshold and the SNR threshold at step 272 and step 274.

If the test of step 274 passes, at step 276, handover is initiated with the target cell selected at step 262. A conventional handover process may be used. A carrier from a source PCell is handed over to a target PCell. Each respective carrier from each respective SCell is handed over to a target SCell. Communication between the network continues using the new connection through the group of cells forming the group.

Further, at step 277, information about the handover process may be provided to an AI/ML process. The information may include information about the particular base station or eNodeB or gNodeB devices involved in the handover, location information such as the location and movement of the UE device involved in the handover, temporal information such as the time of day and day of the week of the handover, and data about the carriers and respective radio channels involved in the handover. The provided information may be used by the AI/ML process for learning and to further refine a machine learning operation.

Figure 2D:
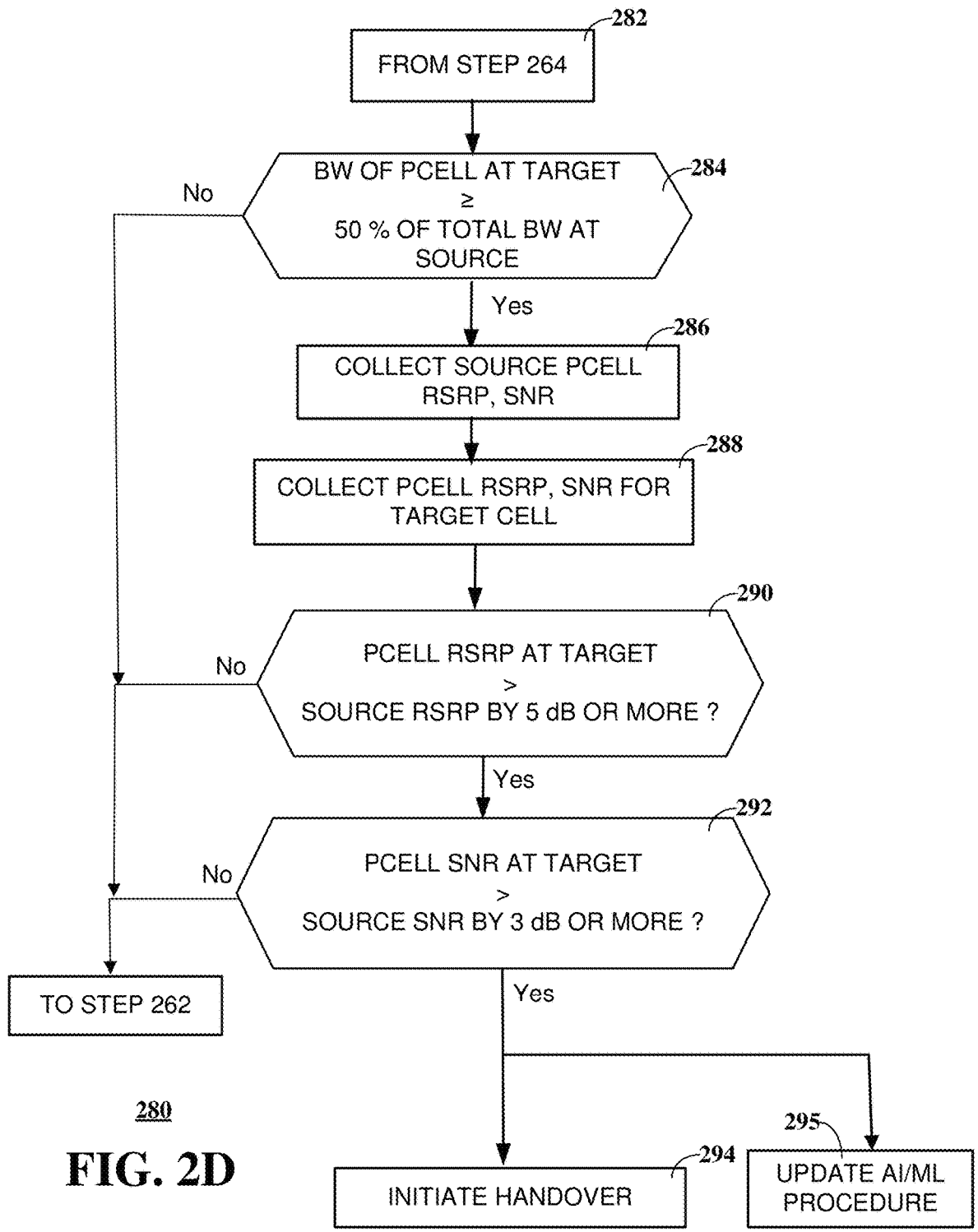
FIG. 2D depicts an illustrative embodiment of a method in accordance with various aspects described herein.

FIG. 2D depicts an illustrative embodiment of a method 280 in accordance with various aspects described herein. Method may initiate following step 264 of method 260 of FIG. 2C. As noted above, at step 264, the method 260 determines a total source bandwidth seen by the UE device and a total target bandwidth available for handover. A UE device such as UE device 232 of FIG. 2B is in radio communication with a source cell. In the example of FIG. 2B, the UE device 232 uses carrier aggregation to implement a 3CA arrangement and communicate with a source PCell 234, a first source SCell 236 and a second source SCell 238. Each of the respective carriers from the source PCell 234, the first SCell 236 and the second SCell 238 has an assigned bandwidth. In an example, the UE device 232 sees a bandwidth of 20 MHz from the source PCell 234, 10 MHz from the first SCell 236 and 10 MHz from the second SCell 238. The numbers of SCells and the assigned bandwidth amounts are exemplary only.

Further, step 264 also includes a process of locating a group of cells such as target PCell 240 first target SCell 242 and second target SCell 244 having available bandwidth for handover of the UE device. In this example, the target group has available two cells to implement a 2CA arrangement. For example, in FIG. 2B, the identified neighboring cell might include the target PCell 248 and its single associated SCell. Also in this example, the target group can implement 2CA with the UE seeing a bandwidth of 40 MHZ from the PCell and a bandwidth of 5 MHz from the SCell.

Referring again to FIG. 2D, at step 284, the method 280 determines if the available bandwidth of the PCell at the group of cells forming the target cell is greater than or equal to fifty percent of the total bandwidth at the group of cells forming the source cell. In the noted example, the total bandwidth at the source cell is 20+10+10=40 MHz. The PCell at group of cells forming the target provides 40 MHz bandwidth and the SCell provides 5 MHz bandwidth in a 2CA arrangement. Since 40 MHz from the PCell of the target exceeds 50% of the 40 MHz total bandwidth at the source, the test of step 284 passes. If the test of step 284 fails, control proceeds to step 262 to evaluate another neighboring cell as a target.

At step 286, information about RSRP and SNR values for the source cell is collected. For example the UE device that is being evaluated for handover reports the RSRP value and the SNR value it determines for each carrier received by the UE device. Any suitable method may be used to determine and report these values. Values for each carrier that is aggregated by the UE device from the group of cells forming the source are collected. Moreover, other radio channel information or parameters in addition to or instead of RSRP and SNR may be evaluated and used as well.

At step 288, information about RSRP and SNR values for the target cell is collected as well. For example, a base station such as an eNodeB or gNodeB of a PCell that is performing the method 280 may obtain target cell RSRP, SNR and other radio channel information from any suitable source, such as the target PCell over an X2 network communication channel. Values for each carrier that would be aggregated by the UE device if the handover actually occurs are collected.

At step 290, the method 280 determines if the PCell at the target passes the RSRP threshold test. That is, the method 280 determines if the RSRP for the PCell exceeds RSRP for the PCell at the group of cells forming the source by a predetermined threshold. As indicated, in some embodiments, the threshold value is set at 5 dB. Other threshold values may be used instead. Moreover, the threshold value may be varied, such as by an AI/ML process that learns from historical and other performance data for the network. If the test of step 290 fails, control proceeds to step 262 to select another neighboring cell for possible handover.

At step 292, the method 280 determines if the PCell at the target passes the SNR threshold test. In this example, the method 280 determines if the SNR for the PCell of the group of cells forming the source exceeds SNR for the PCell at the group of cells forming the source by a predetermined threshold. As indicated, in some embodiments, the threshold value is set at 3 dB. Other threshold values may be used instead. Further, the threshold value may be variable based on input from, for example, an AI/ML process. If the test of step 292 fails, control proceeds to step 262 to select another neighboring cell for possible handover.

If the test of step 292 passes, at step 294, handover is initiated with the target cell selected at step 262. A conventional handover process may be used. A carrier from a source PCell is handed over to a target PCell. Each respective carrier from each respective SCell is handed over to a target SCell. Communication between the network continues using the new connection through the group of cells forming the group.

Further, at step 295, information about the handover process may be provided to an AI/ML process. the information may include information about the particular base station or eNodeB or gNodeB devices involved in the handover, location information such as the location and movement of the UE device involved in the handover, temporal information such as the time of day and day of the week of the handover, and data about the carriers and respective radio channels involved in the handover. The provided information may be used by the AI/ML process for learning and to further refine a ML process.

The methodology according to various aspects described herein substantially reduces unnecessary handovers and improves the outcome of a handover operation. The methodology significantly improves the overall performance of 5G networks and future networks in which billions of handover operations take place every day. The benefits include, for example, improved handover accuracy, faster handover completion when carrier aggregation is employed; improved connectivity and data rate for end users including signaling at a PCell and data throughput at SCells; and improved carrier aggregation spectrum efficiency to better utilize radio resource. Benefits further include reduced neighboring interference when PCell and SCell coverage are imbalanced; and avoiding handover Ping-Pong scenarios when RSRP fluctuates at the PCell, which can be common in wireless networks.

While for purposes of simplicity of explanation, the respective processes are shown and described as a series of blocks in FIG. 2C and FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of radio communication network 200, and method 230 presented in FIGS. 1, 2A, 2B, 2C, 2D and 3. For example, virtualized communication network 300 can facilitate in whole or in part selecting a target cell in a wireless network for handover from a source cell using carrier aggregation to communicate with user equipment based on total bandwidth of the carriers, Reference Signal Received Power (RSRP) and Signal to Noise Ratio (SNR) for the carriers.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
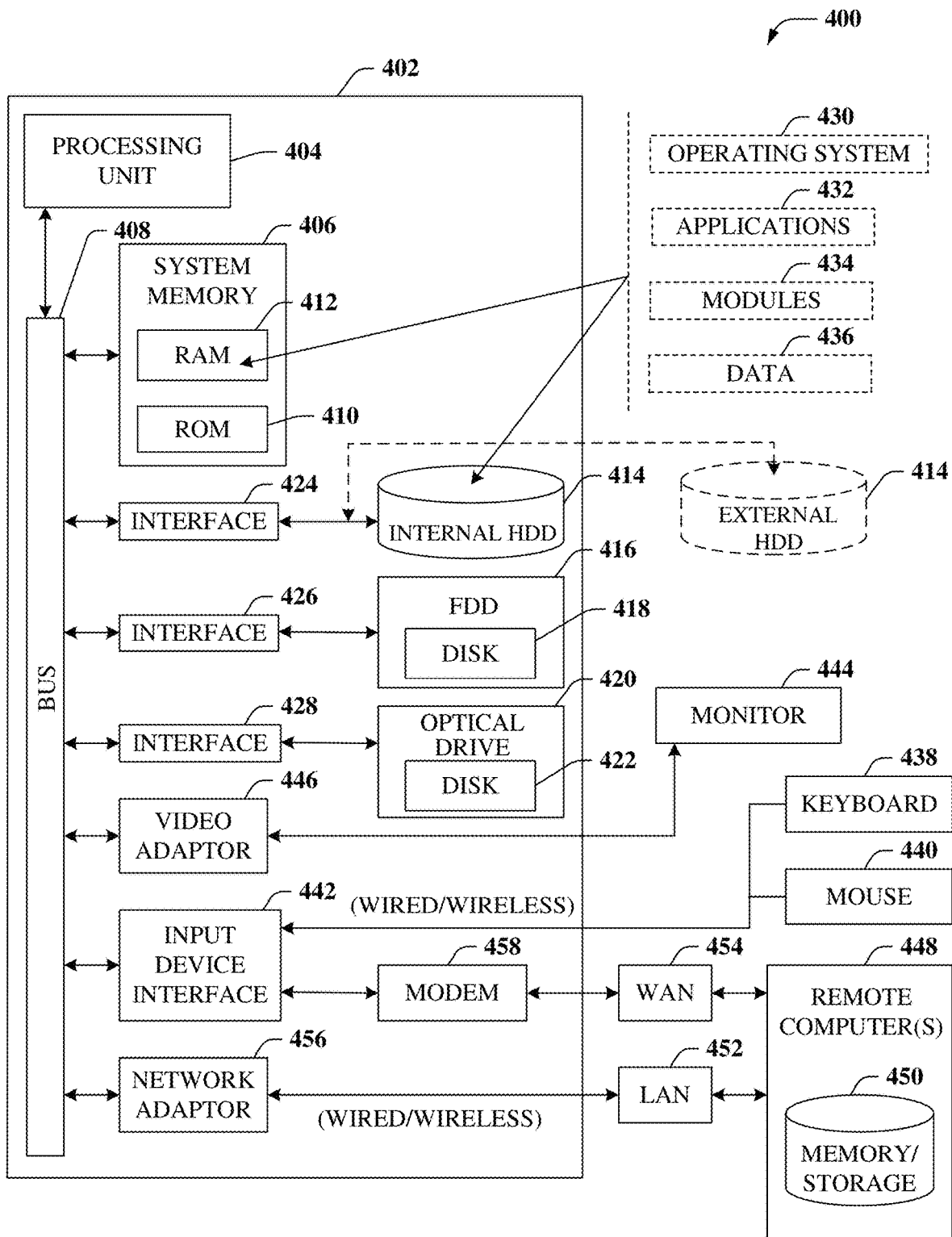
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part selecting a target cell in a wireless network for handover from a source cell using carrier aggregation to communicate with user equipment based on total bandwidth of the carriers, Reference Signal Received Power (RSRP) and Signal to Noise Ratio (SNR) for the carriers.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
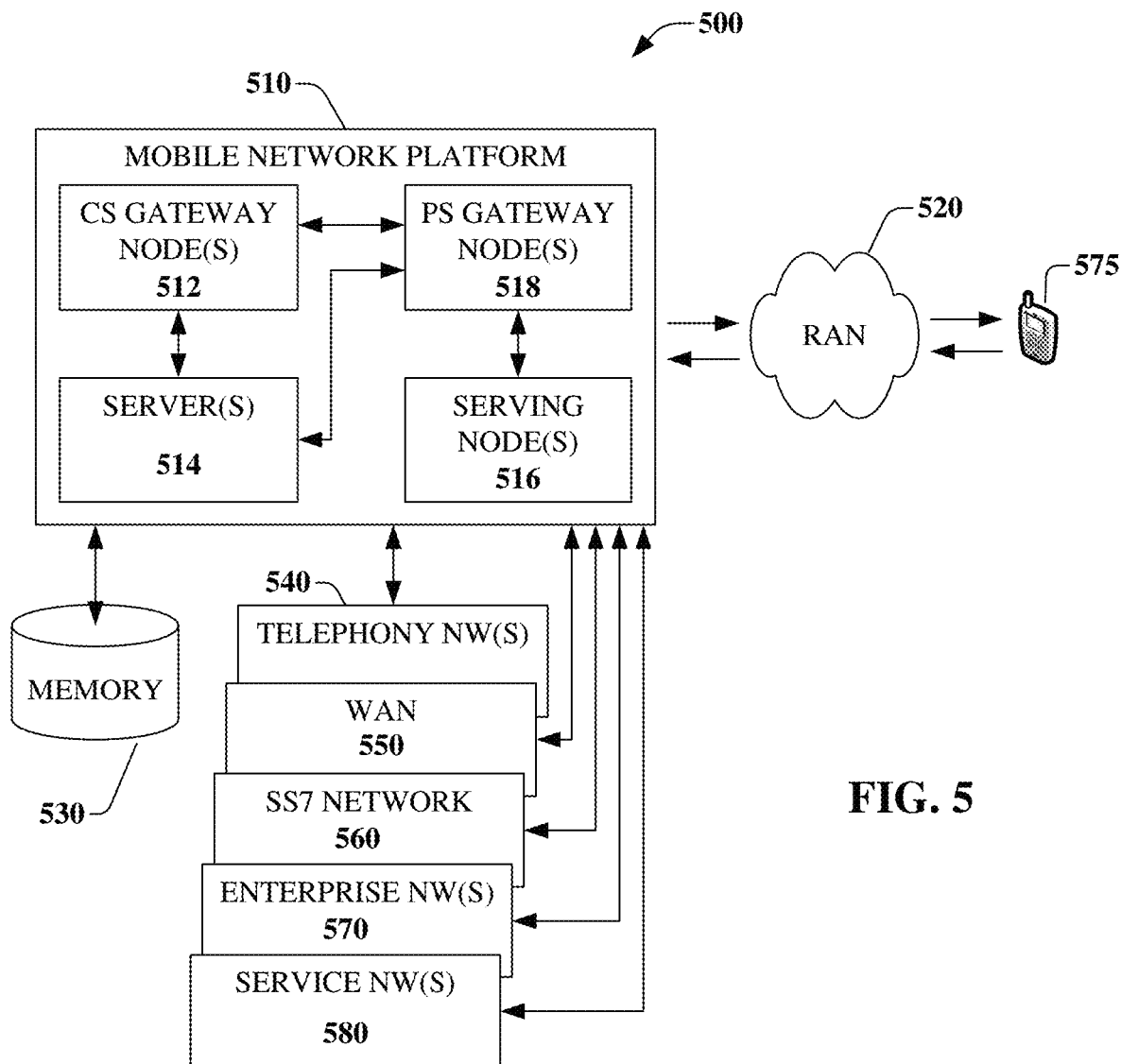
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part selecting a target cell in a wireless network for handover from a source cell using carrier aggregation to communicate with user equipment based on total bandwidth of the carriers, Reference Signal Received Power (RSRP) and Signal to Noise Ratio (SNR) for the carriers. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500l, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
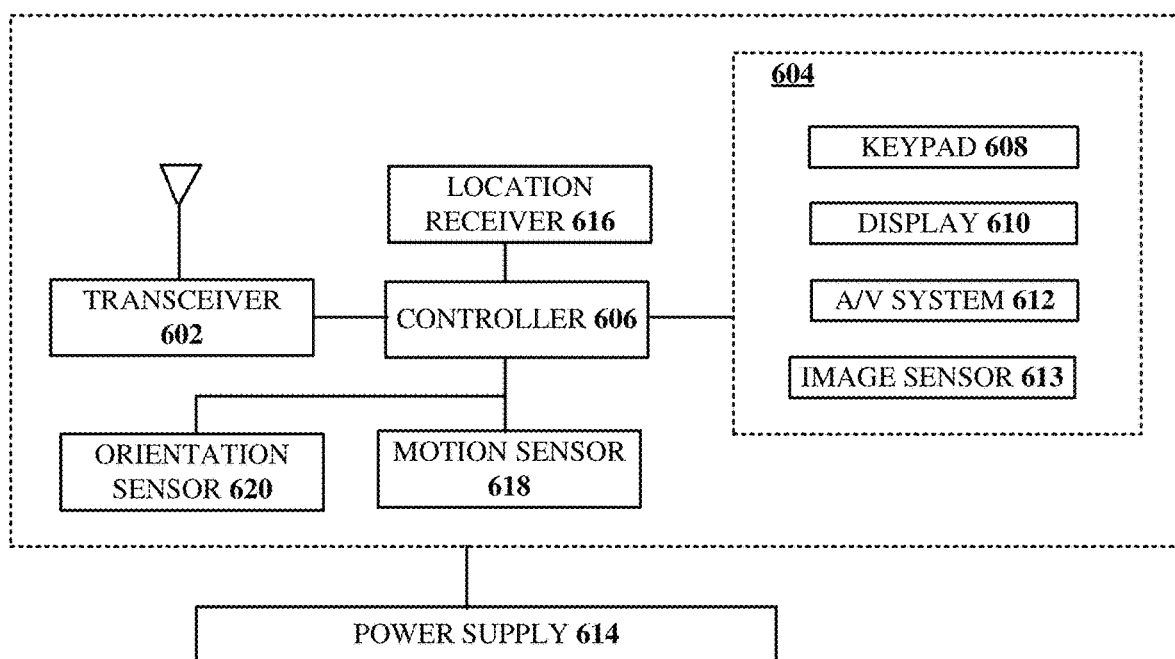
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part selecting a target cell in a wireless network for handover from a source cell using carrier aggregation to communicate with user equipment based on total bandwidth of the carriers, Reference Signal Received Power (RSRP) and Signal to Noise Ratio (SNR) for the carriers.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi_33, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
selecting, at a network element of a wireless communication network, a neighboring cell as a handover candidate to begin communication as a target cell with a user equipment (UE) device, the UE device currently communicating with a source cell of the wireless communication network, wherein the source cell includes a source group of cells including a source primary cell (PCell) and one or more source secondary cells (SCells), wherein the UE device receives a respective source carrier from each respective cell of the source group of cells in a carrier aggregation arrangement, wherein the neighboring cell includes a target group of cells including a target PCell and one or more target SCells, and wherein the UE device is configured to receive a respective target carrier from each respective cell of the target group of cells following a handover of communication from the source cell to the target cell;
determining a total source bandwidth, wherein the total source bandwidth includes a sum of respective bandwidth values of each respective source carrier;
determining a total target bandwidth, wherein the total target bandwidth includes a sum of respective bandwidth values of each respective target carrier;
determining, for each respective source carrier, a respective Reference Signal Received Power (RSRP) value and a respective Signal to Noise Ratio (SNR) value;
determining, for each respective target carrier, a respective RSRP value and a respective SNR value;
identifying, as an improved RSRP target carrier, each respective target carrier having a respective RSRP value exceeding a respective RSRP value for a respective source carrier by a predetermined RSRP threshold;
identifying, as an improved SNR target carrier, each respective target carrier having a respective SNR value exceeding a respective SNR value for a respective source carrier by a predetermined SNR threshold;
combining respective bandwidth values of each improved RSRP target carrier, forming an improved RSRP carrier bandwidth;
combining respective bandwidth values of each improved SNR target carrier, forming an improved SNR carrier bandwidth;
comparing the RSRP carrier bandwidth with a carrier RSRP handover threshold;
comparing the SNR carrier bandwidth with a carrier SNR handover threshold; and
initiating the handover of communication from the source cell to the target cell, wherein the initiating the handover is responsive to
the RSRP carrier bandwidth exceeding the RSRP handover threshold, and
the SNR carrier bandwidth exceeding the SNR handover threshold.

2. The device of claim 1, wherein the operations further comprise:
receiving the carrier RSRP handover threshold and the carrier SNR handover threshold from an artificial intelligence/machine learning process.

3. The device of claim 2, wherein the operations wherein the RSRP handover threshold is 5 dB and wherein the SNR handover threshold is 3 dB.

4. The device of claim 2, wherein the operations further comprise:
receiving and updated carrier RSRP handover threshold and an updated carrier SNR handover threshold from the artificial intelligence/machine learning process.

5. The device of claim 2, wherein the operations further comprise:
receiving as the carrier RSRP handover threshold a value of fifty percent; and receiving as the carrier SNR handover threshold a value of fifty percent.

6. The device of claim 1, wherein the operations further comprise:
comparing the total source bandwidth and the total target bandwidth; and
initiating the handover of communication from the source cell to the target cell only if the total target bandwidth exceeds the total source bandwidth.

7. The device of claim 1, wherein the operations further comprise:
determining a target PCell bandwidth;
comparing the target PCell bandwidth with the total source bandwidth;
determining a target PCell RSRP value;
comparing the target PCell RSRP value with the carrier RSRP handover threshold;
determining a target PCell SNR value;
comparing the target PCell SNR value with the carrier SNR handover threshold; and
initiating the handover of communication from the source cell to the target cell only if
the target PCell bandwidth exceeds a predetermined percentage of the total source bandwidth,
the target PCell RSRP value exceeds the RSRP handover threshold, and
the target PCell SNR value exceeds the SNR handover threshold.

8. The device of claim 7, wherein the operations further comprise:
receiving as the predetermined percentage of the total source bandwidth a value of 50 percent.

9. The device of claim 1, wherein the selecting a neighboring cell as a handover candidate comprises:
selecting as the handover candidate a neighboring cell having fewer SCells than the source cell.

10. A non-transitory machine-readable medium, comprising executable instructions that, when executed by a processing system including a processor, facilitate performance of operations, the operations comprising:
selecting, at a source cell serving a user equipment (UE) device in a wireless network, a target cell for a handover of communication with the UE device, wherein the source cell includes a source group of cells including a source primary cell (PCell) and one or more source secondary cells (SCells), wherein the source cell transmits to the UE device a plurality of source carriers, each respective source carrier transmitted from a respective cell of the source group of cells in a carrier aggregation arrangement, wherein the target cell includes a target group of cells including a target PCell and one or more target SCells, and wherein the target cell is configured to transmit to the UE device a plurality of target carriers, each respective target carrier of the plurality of target carriers transmitted from a respective cell of the target group of cells following a handover of communication from the source cell to the target cell;
determining, for each respective source carrier, a respective source Reference Signal Received Power (RSRP) value and a respective source Signal to Noise Ratio (SNR) value;
determining, for each respective target carrier, a respective target RSRP value and a respective target SNR value;
identifying, as an improved RSRP target carrier, all respective target carriers having a respective target RSRP value exceeding a respective source RSRP value for a respective source carrier by a predetermined RSRP threshold;
identifying, as an improved SNR target carrier, all respective target carrier having a respective target SNR value exceeding a respective source SNR value for a respective source carrier by a predetermined SNR threshold;
summing respective bandwidth values of each improved RSRP target carrier, forming an improved RSRP carrier bandwidth amount;
summing respective bandwidth values of each improved SNR target carrier, forming an improved SNR carrier bandwidth amount; and
initiating the handover of communication from the source cell to the target cell, wherein the initiating the handover is responsive to
the RSRP carrier bandwidth amount exceeding a RSRP handover threshold, and
the SNR carrier bandwidth amount exceeding a SNR handover threshold.

11. The non-transitory machine-readable medium of claim 10, wherein the operations further comprise:
determining a total source bandwidth, wherein the total source bandwidth includes a sum of respective bandwidth values of each respective source carrier;
determining a total target bandwidth, wherein the total target bandwidth includes a sum of respective bandwidth values of each respective target carrier; and
initiating the handover responsive to the total target bandwidth exceeding the total source bandwidth.

12. The non-transitory machine-readable medium of claim 11, wherein the operations further comprise:
comparing a target PCell bandwidth with the total source bandwidth;
comparing a target PCell RSRP value with the RSRP handover threshold;
comparing a target PCell SNR value with the SNR handover threshold; and
initiating the handover of communication from the source cell to the target cell responsive to
the target PCell bandwidth exceeding a predetermined percentage of the total source bandwidth,
the target PCell RSRP value exceeding the RSRP handover threshold, and
the target PCell SNR value exceeding the SNR handover threshold.

13. The non-transitory machine-readable medium of claim 10, wherein the operations further comprise:
receiving the RSRP handover threshold and the SNR handover threshold from an automated process; and
providing information about the handover of communication with the UE device to the automated process following the handover of communication with the UE device.

14. The non-transitory machine-readable medium of claim 13, wherein the operations further comprise:
receiving an updated RSRP handover threshold and an updated SNR handover threshold from the automated process.

15. A method, comprising:
determining, by a processing system including a processor, a Reference Signal Received Power (RSRP) and a Signal to Noise Ratio (SNR) for each of a plurality of carriers at a user equipment (UE) device, wherein the plurality of carriers include carriers communicated by a source group of cells including a source primary cell (PCell) and one or more source secondary cells (SCells) associated with the source PCell; and initiating, by the processing system, a handover of communication with the UE device from the source group of cells to a target group of cells, wherein the target group of cells includes a target PCell and one or more target SCells, wherein the initiating the handover is responsive to an RSRP of the carriers of the target group of cells exceeding a predetermined RSRP threshold above the RSRP of the carriers of the source group of cells and a SNR of carriers of the target group of cells exceeding a predetermined SNR threshold above the carriers of the source group of cells.

16. The method of claim 15, further comprising:

determining, by the processing system, a respective RSRP value for each respective carrier of the plurality of carriers, wherein the plurality of carriers are aggregated at the UE device for communication with the source group of cells;

determining, by the processing system, a respective SNR value for each respective carrier of the plurality of carriers;

comparing, by the processing system, respective RSRP values for carriers of the target group of cells with respective RSRP values for carriers of the source group of cells;

comparing, by the processing system, respective SNR values for carriers of the target group of cells with respective SNR values for carriers of the source group of cells; and initiating, by the processing system, the handover, wherein the initiating is responsive to the respective RSRP values for carriers of the target group of cells exceeding the respective RSRP values for carriers of the source group of cells by the predetermined RSRP threshold and responsive to the respective SNR values for carriers of the target group of cells exceeding the respective SNR values for carriers of the source group of cells by the predetermined SNR threshold.

17. The method of claim 16, comprising:

determining, by the processing system, a total bandwidth of all carriers seen by the UE device from the target group of cells;

determining, by the processing system, for each respective carrier seen by the UE device from the target group of cells, a respective carrier proportion of total bandwidth of all carriers seen by the UE device from the target group of cells relative to the total bandwidth of all carriers seen by the UE device from the target group of cells;

determining, by the processing system, a total carrier RSRP proportion exceeding the respective RSRP values for carriers of the source group of cells by the RSRP threshold, the total carrier RSRP proportion including a sum of respective carrier proportions of total bandwidth exceeding the respective RSRP values for carriers of the source group of cells by the RSRP threshold;

determining, by the processing system, a total carrier SNR proportion exceeding the respective RSRP values for carriers of the source group of cells by the SNR threshold, the total carrier SNR proportion including a sum of respective carrier proportions of total bandwidth exceeding the respective SNR values for carriers of the source group of cells by the SNR threshold; and initiating, by the processing system, the handover, wherein the initiating the handover is responsive to the total carrier RSRP proportion exceeding a majority of the total bandwidth of all carriers seen by the UE device from the target group of cells, and responsive to the total carrier RSRP proportion exceeding a majority of the total bandwidth of all carriers seen by the UE device from the target group of cells.

18. The method of claim 16, comprising:

adjusting, by the processing system, the predetermined RSRP threshold; and adjusting, by the processing system, the predetermined SNR threshold.

19. The method of claim 18, comprising:

receiving by the processing system, updated threshold values from an artificial intelligence/machine learning application; and adjusting, by the processing system, the predetermined RSRP threshold and the predetermined SNR threshold responsive to the updated threshold values.

20. The method of claim 19, comprising:

providing, by the processing system, information about the handover of communication with the UE device from the source group of cells to a target group of cells to the artificial intelligence/machine learning application.

* * * * *